US011299101B2

(12) United States Patent
Busse

(10) Patent No.: US 11,299,101 B2
(45) Date of Patent: Apr. 12, 2022

(54) ATTACHMENT ASSEMBLY

(71) Applicant: Ford Global Technologies, LLC, Dearborn, MI (US)

(72) Inventor: Ryan Busse, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 16/547,260

(22) Filed: Aug. 21, 2019

(65) Prior Publication Data

US 2021/0053500 A1    Feb. 25, 2021

(51) Int. Cl.
*B60R 7/04* (2006.01)
*B60R 11/00* (2006.01)

(52) U.S. Cl.
CPC ......... *B60R 7/043* (2013.01); *B60R 2011/008* (2013.01); *B60R 2011/0015* (2013.01); *B60R 2011/0052* (2013.01); *B60R 2011/0071* (2013.01)

(58) Field of Classification Search
CPC ... B60R 7/04; B60R 7/043; B60R 2011/0015; B60R 7/005; B60R 7/08
USPC .......................................... 224/275, 584, 585
See application file for complete search history.

(56) References Cited

U.S. PATENT DOCUMENTS

| | | | | |
|---|---|---|---|---|
| 4,954,030 A * | 9/1990 | Szucs | ................ | B60P 7/0823 224/318 |
| 6,694,644 B2 * | 2/2004 | Haupt | ................ | A43C 11/1413 36/50.5 |
| 6,791,717 B1 * | 9/2004 | Ariga | ................ | H04N 1/405 358/2.1 |
| 6,994,050 B2 | 2/2006 | Johnson et al. | | |
| 7,020,897 B2 * | 4/2006 | Johnson | ................ | F41H 1/02 2/102 |
| 7,047,570 B2 * | 5/2006 | Johnson | ................ | F41H 1/02 2/102 |

(Continued)

FOREIGN PATENT DOCUMENTS

EP    2436562 A1 *  4/2012    ............... B60R 5/04
GB    2559751 A       8/2018

OTHER PUBLICATIONS

FCA US LLC, "The All-New Wrangler Jeep—2018—The Definitive Guide," (57 pages), 2018, Jeep.com, USA.

(Continued)

*Primary Examiner* — Nathan J Newhouse
*Assistant Examiner* — Lester L Vanterpool
(74) *Attorney, Agent, or Firm* — Vichit Chea; Price Heneveld LLP

(57) ABSTRACT

A vehicle seat comprises a carrier including first, second, third, and fourth carrier members and a strap disposed across opposing first and second carrier members. The strap includes a first end fixedly coupled to the first carrier member and a second end adjustably coupled to an attachment assembly disposed on the second carrier member. A rod is disposed transverse to the strap and is coupled to opposing third and fourth carrier members, wherein the attachment assembly includes an adjustment mechanism for setting a usable length of the strap, and wherein the usable length includes a first usable length, a second usable length, and an intermediate length between the first usable length and the second usable length.

15 Claims, 15 Drawing Sheets

(56) References Cited

U.S. PATENT DOCUMENTS

| | | | | |
|---|---|---|---|---|
| 7,490,358 | B1* | 2/2009 | Beck | A41D 13/0531 |
| | | | | 2/102 |
| 7,963,427 | B2* | 6/2011 | Calkin | A41D 13/0012 |
| | | | | 224/675 |
| 8,002,159 | B2* | 8/2011 | Cragg | A45F 5/02 |
| | | | | 224/579 |
| 8,011,545 | B2* | 9/2011 | Murdoch | B25H 3/00 |
| | | | | 224/672 |
| 8,118,201 | B1 | 2/2012 | Calkin | |
| 8,490,212 | B1* | 7/2013 | Asher | A41D 1/04 |
| | | | | 2/2.5 |
| 8,627,514 | B1* | 1/2014 | Scoggins | A45F 5/00 |
| | | | | 2/102 |
| 8,814,020 | B2* | 8/2014 | Yaeger | A45F 3/14 |
| | | | | 224/665 |
| 9,144,294 | B2* | 9/2015 | Gregory | A45F 3/04 |
| 9,271,559 | B2* | 3/2016 | Gleason | A45F 3/06 |
| 10,214,148 | B2* | 2/2019 | Cinto | B60R 7/02 |
| 10,264,874 | B2* | 4/2019 | Becker | A45F 5/02 |
| 10,308,301 | B2* | 6/2019 | Walk | B60N 2/5816 |
| 10,427,611 | B2* | 10/2019 | Vanderpool | B60N 3/004 |
| 10,589,688 | B2* | 3/2020 | Diaz Paredes | B60R 7/005 |
| 2007/0246914 | A1* | 10/2007 | Neiley | A63C 10/06 |
| | | | | 280/624 |
| 2007/0289045 | A1* | 12/2007 | Evans | A45F 3/06 |
| | | | | 2/102 |
| 2009/0014602 | A1* | 1/2009 | Frost | B60R 7/08 |
| | | | | 248/100 |
| 2011/0278339 | A1* | 11/2011 | Hexels | F41H 1/02 |
| | | | | 224/676 |
| 2013/0068919 | A1* | 3/2013 | Antonioni | B60R 11/00 |
| | | | | 248/614 |
| 2013/0193179 | A1* | 8/2013 | Davidson | A45C 13/001 |
| | | | | 224/585 |
| 2013/0214119 | A1* | 8/2013 | Antonioni | B42F 13/0013 |
| | | | | 248/614 |
| 2014/0183234 | A1* | 7/2014 | Hudspeth | B60R 7/14 |
| | | | | 224/275 |
| 2019/0077330 | A1* | 3/2019 | Michalak | B60N 2/3047 |
| 2019/0217784 | A1 | 7/2019 | Vanderpool et al. | |
| 2019/0366932 | A1 | 12/2019 | Diaz Paredes et al. | |

OTHER PUBLICATIONS

Commonly assigned co-pending U.S. Appl. No. 15/192,631, filed May 30, 2018, including filing receipt, application, and drawings.

* cited by examiner

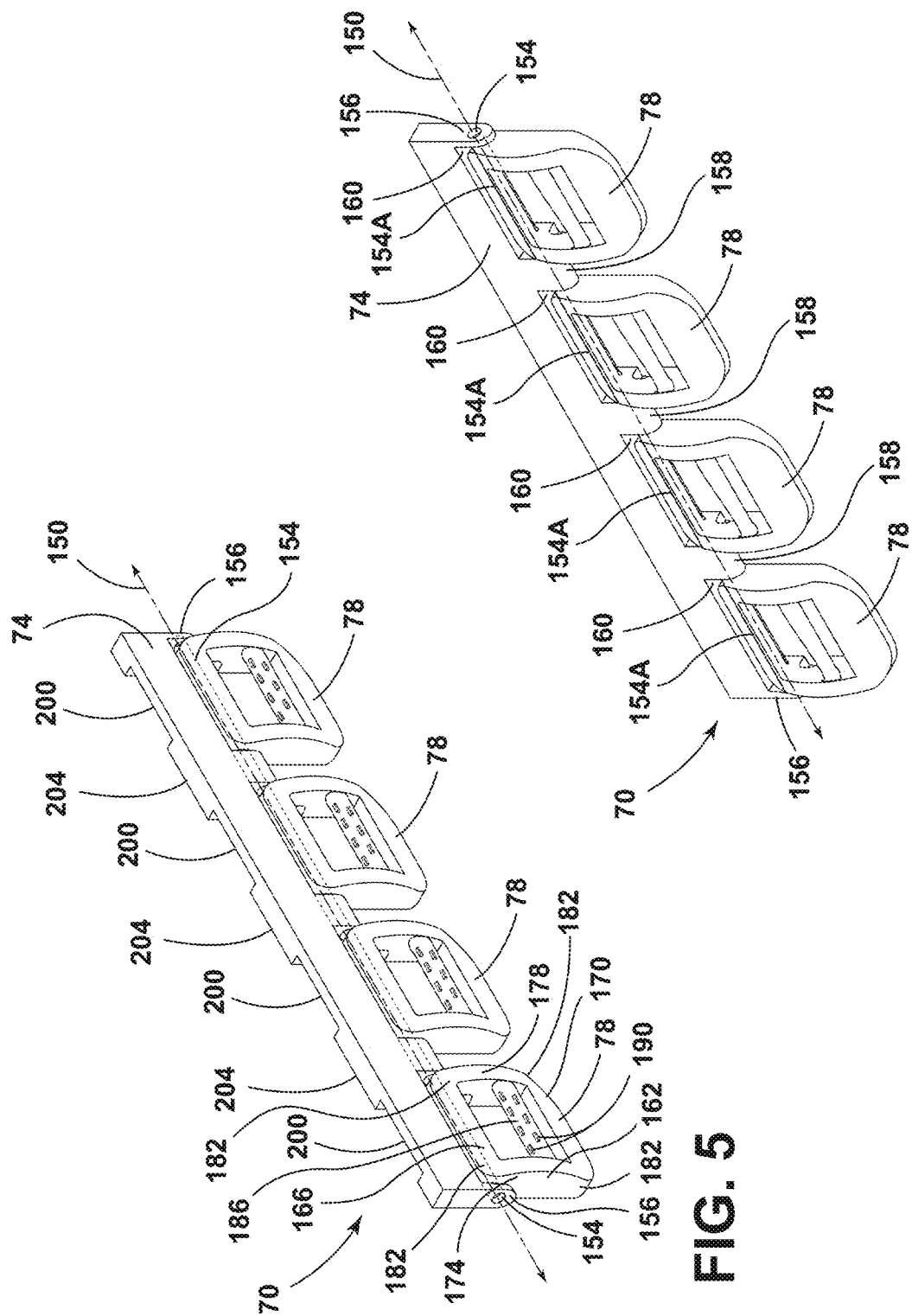

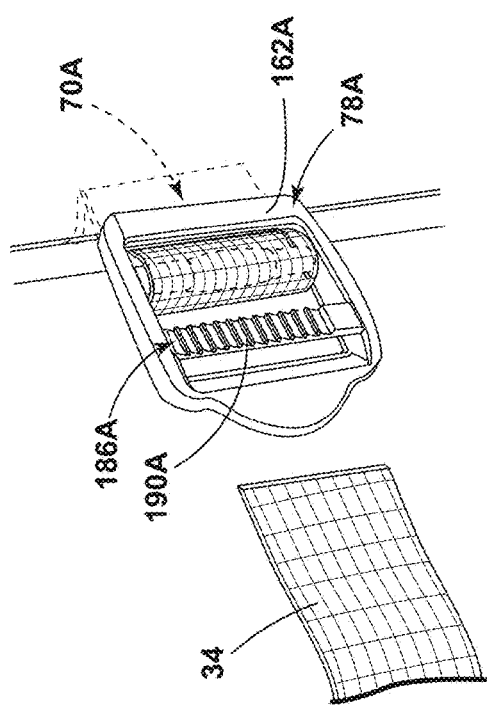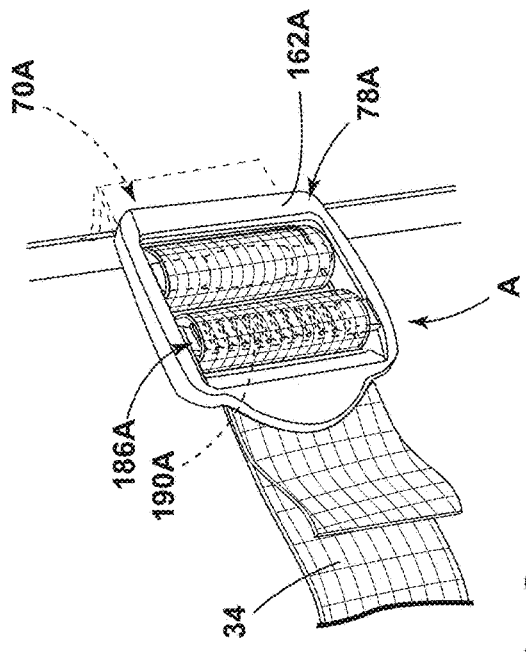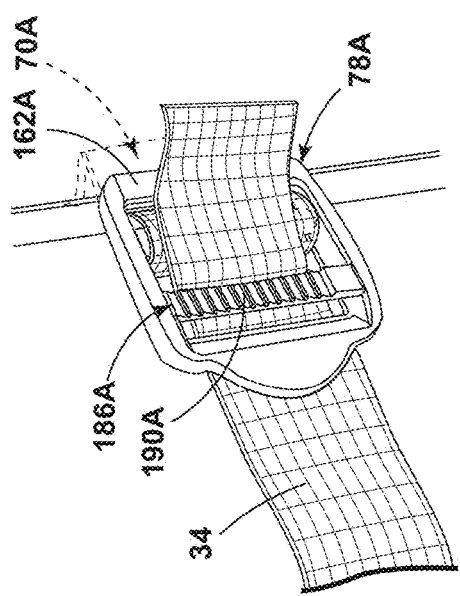

ATTACHMENT ASSEMBLY

FIELD OF THE DISCLOSURE

The present disclosure generally relates to vehicle seats, and more particularly to storage areas for vehicle seats.

BACKGROUND OF THE DISCLOSURE

Vehicle seats commonly include storage areas for passenger items. Improved seatback storage for passenger items is desired.

SUMMARY OF THE DISCLOSURE

According to one aspect of the present disclosure, a vehicle seat comprises a carrier including first, second, third, and fourth carrier members and a strap disposed across opposing first and second carrier members. The strap includes a first end fixedly coupled to the first carrier member and a second end adjustably coupled to an attachment assembly disposed on the second carrier member. A rod is disposed transverse to the strap and is coupled to opposing third and fourth carrier members. The attachment assembly includes an adjustment mechanism for setting a usable length of the strap, wherein the usable length includes a first usable length, a second usable length, and an intermediate length between the first usable length and the second usable length.

Embodiments of the first aspect of the disclosure can include any one or a combination of the following features:
- the attachment assembly includes an elongated member, wherein the adjustment mechanism is pivotably coupled to the elongated member;
- the adjustment mechanism is rotatable about an axis defined by a connector extending through the elongated member and the adjustment mechanism;
- the adjustment mechanism includes a first portion and a second portion;
- the first portion includes a housing, and the second portion includes a cross member;
- the cross member extends across the housing;
- the cross member includes teeth;
- the attachment assembly is mounted to the second carrier member;
- the carrier includes a seatback frame;
- the strap is one of a plurality of straps, the rod is one of a plurality of rods, and the adjustment mechanism is one of a plurality of adjustment mechanisms;
- the plurality of straps are disposed in a substantially horizontal position, and the plurality of rods are disposed in a substantially vertical position;
- a seatback surface is disposed behind the carrier, and one or more positioners are disposed between the seatback surface and the plurality of rods;
- at least one of the one or more positioners includes a base portion and a protrusion; and
- the strap is removably fastened to the first carrier member with a detachable fastener.

According to a second aspect of the present disclosure, an attachment assembly comprises an elongated member configured for mounting to a mountable surface. One or more adjustment mechanisms are positionable in a fastened position or an unfastened position, are rotatably coupled to the elongated member, are positionable in respective one or more recesses in the elongated member, and are configured to receive an end of each of the one or more straps disposed across the mountable surface. In the fastened position, the one or more adjustment mechanisms are configured to substantially immobilize portions of the one or more straps in the adjustment mechanisms.

Embodiments of the second aspect of the present disclosure can include any one or a combination of the following features:
- each of the one or more adjustment mechanisms is configured to receive one of the one or more straps positionable across the mountable surface and has a first end fastenable to the mountable surface and a second end slidable in the one or more adjustment mechanisms;
- each of the one or more adjustment mechanisms further comprises a housing with a cross member; and
- each of the one or more adjustment mechanisms is rotatably coupled to the elongated member along an axis defined by one or more pins extending through the elongated member and the one or more adjustment mechanisms, wherein the one or more adjustment mechanisms are rotatable between a fastened position and an unfastened position.

According to a third aspect of the present disclosure, a mountable surface for an attachment assembly comprises a plurality of detachable straps disposed across the mountable surface and positioned against the mountable surface by one or more retainers extending along the mountable surface and transverse to the plurality of detachable straps. Each of the plurality of detachable straps includes a first end and a second end. A support structure is disposed on or behind the mountable surface and has a side configured to receive a releasable fastener for securing the first end to the mountable surface. An attachment assembly is coupled to the support structure and includes a mounting member. One or more adjustment mechanisms are each nestable in a recess of the mounting member, are pivotable relative to the mounting member, and are positionable in a fastened position or an unfastened position, wherein, in the fastened position, each of the plurality of detachable straps has a fixed usable length, and in the unfastened position, each of the plurality of detachable straps is adjustable between a first usable length and a second usable length.

Embodiments of the third aspect of the present disclosure can include the following feature:
- portions of the plurality of detachable straps are disposed between a first retainer and a second retainer to form loops configured to support passenger items on the mountable surface, wherein the mountable surface includes one or more of: a seat, a seatback, a vehicle door, a vehicle tailgate, a vehicle headliner, a backpack, and an item of clothing.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5 is a first front perspective view of an attachment assembly;

FIG. 6 is a second front perspective view of the attachment assembly of FIG. 5;

FIG. 15A is a perspective view of an example of an adjustment mechanism and a strap;

FIG. 15B is a perspective view of the adjustment mechanism of FIG. 15A with a partially inserted strap;

FIG. 15C is a second front perspective view of the adjustment mechanism of FIG. 15A with a fully inserted strap with the adjustment mechanism in a fastened position;

DETAILED DESCRIPTION

Figure 1:
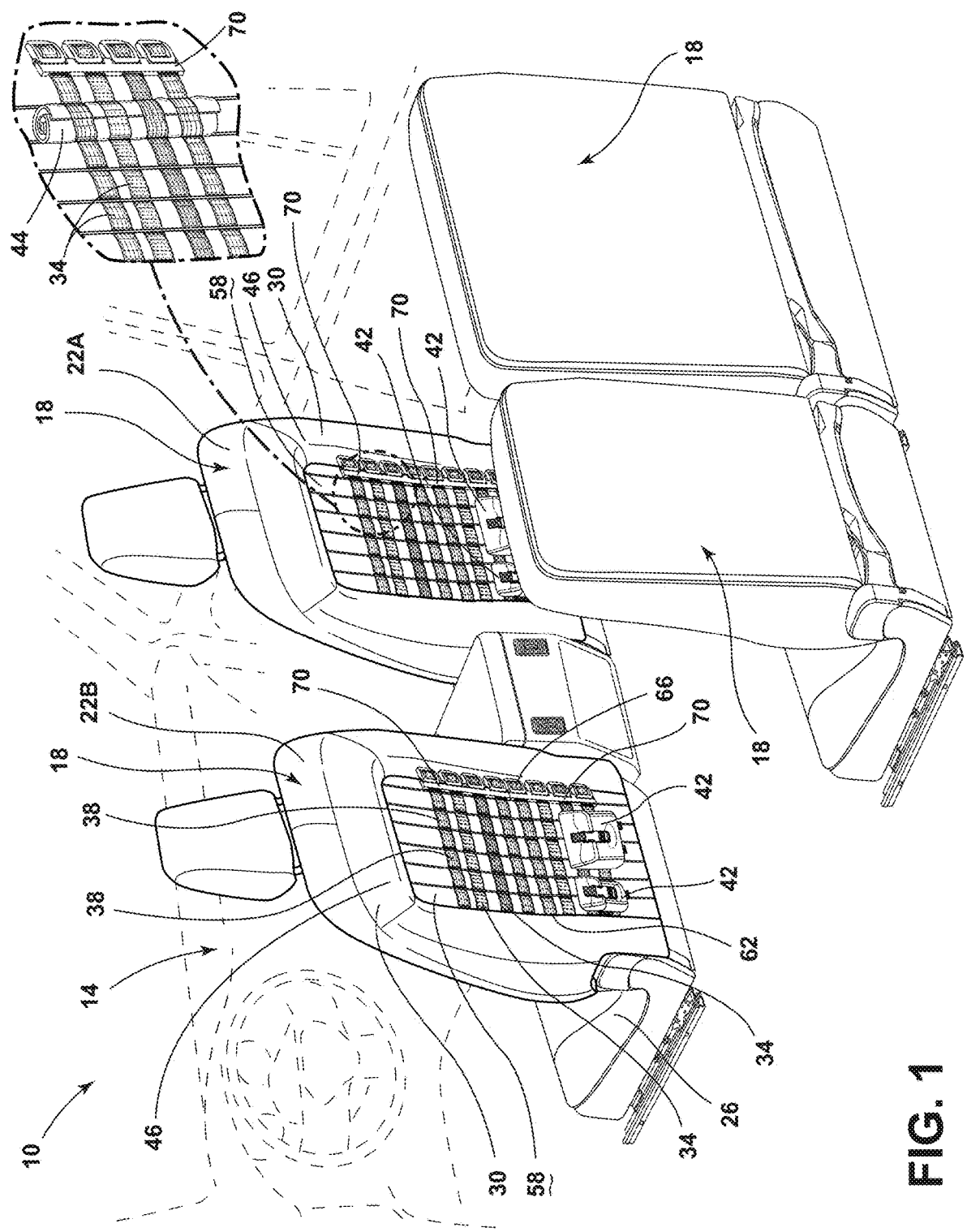
FIG. 1 is a back perspective view of a seatback with a first configuration of an attachment assembly in a vehicle interior, according to an aspect of the present disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4B, a vehicle 10 may include a seatback 30 with straps 34 and an attachment assembly 70 for adjusting the usable length (L1, L2) of straps 34. A vehicle interior 14 is shown having a driver side seat 22B and a passenger side seat 22A. Each of the driver side seat 22B and the passenger side seat 22A includes a seat bottom 26 and a seatback 30. The driver side seat 22B and the passenger side seat 22A are shown equipped on the seatbacks 30 with straps 34 that form loops 38 for supporting one or more passenger items. With reference to FIG. 1, in one example, passenger items may include two storage pouches 42 and a rolled towel 44. In addition to the two storage pouches 42 and the rolled towel 44, a variety of additional passenger items (for example, sunglasses and a water bottle attached to the straps 34 with a carabiner) may be stored on the straps 34. Passenger items may be suspended from the straps 34 or retained against the seatback 30 by the straps 34. It is desirable to have a variety of easily accessible, visible areas on the seatback 30. Passengers seated in the passenger side seat 22A are able to see items stored on the driver side seatback 30. Passenger seated in the driver side seat 22B are able to see items stored on the passenger side seatback 30.

Referring to FIGS. 1-4B, the driver side seatback 30 may include a rear portion 46 with substantially horizontal straps 34 disposed over the rear portion 46. The straps 34 may be disposed on a carrier 50. The carrier 50 may be mounted to a seatback 30. The carrier 50 may also be mounted to a seatback surface 58. The carrier 50 may be a unitary part, or the carrier 50 may be defined by separate parts. Each strap 34 may include two ends 62, 66. An attachment assembly 70 disposed at the side of the seat 18 may include an elongated member 74 and adjustment mechanisms 78 disposed along the elongated member 74. Ends 62 of the straps 34 are shown attached to the seat 18. Ends 66 of the straps 34 are shown routed through the adjustment mechanisms 78. The portions of the straps 34 extending from the screws 110 to adjustment mechanisms 78 may be referred to as the usable portions or usable lengths 82 of the straps 34. Loops 38, formed by the usable portions 82 of the straps 34, may be used to support passenger items, such as the storage pouches 42 and rolled towel 44, on the seatback 30. A passenger may adjust the usable length (for example, L1 or L2) of each strap 34 by sliding the strap 34 within the adjustment mechanism 78. The passenger may tighten the adjustment mechanism 78 to secure the strap at a fixed usable length (for example, L1 or L2). The usable length (L1 or L2) of each strap 34 may be varied to accommodate the passenger item(s) stored on each strap 34. For example, the usable length (for example, L1 or L2) of a strap 34 may be longer when a passenger wishes to store a rolled towel 44 in the strap 34 than when a passenger wishes to hang a storage pouch 42 from the strap 34.

With continued reference to FIGS. 1-4B, when the strap 34 has a first usable length L1, the strap 34 spans a first distance D1 on the seatback 30. When the strap 34 has a second usable length L2, the strap 34 spans a second distance D2 on the seatback 30.

Figure 3A:
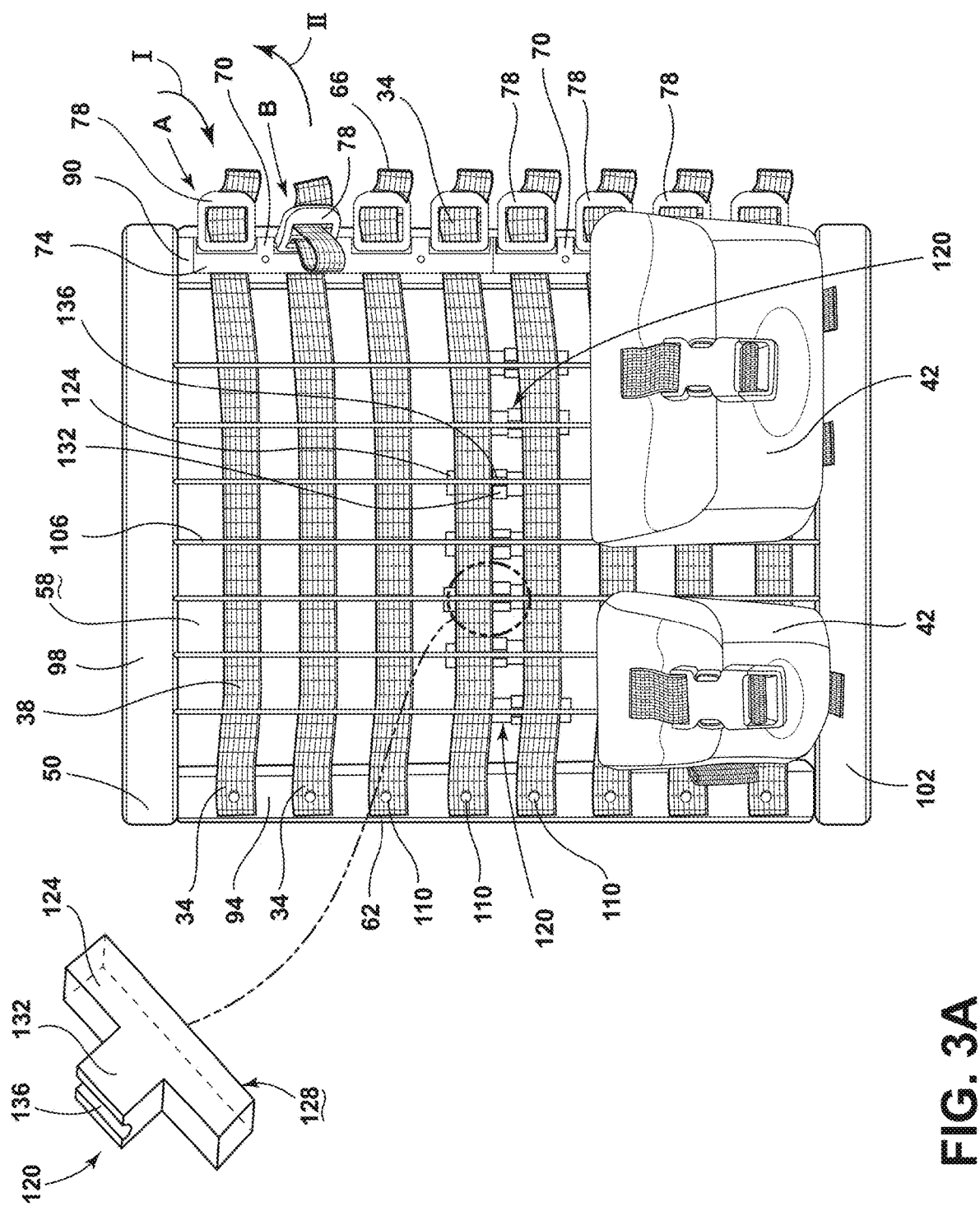
FIG. 3A is a front elevational view of attachment assemblies and straps disposed on a carrier, according to an aspect of the present disclosure.

Referring to FIG. 3A, an adjustment mechanism 78 is shown in a fastened position A and an unfastened position B. The adjustment mechanism 78 may be rotated in the direction shown by arrow I about an axis 150 defined by a pin 154 (FIG. 5) to move the adjustment mechanism from the fastened position A to the unfastened position B. In the unfastened position B, the strap 34 may be slidably adjusted in the adjustment mechanism 78. The adjustment mechanism may be rotated in the direction shown by the arrow II about the axis 150 defined by a pin 154 (FIG. 5) to move the adjustment mechanism 78 from the unfastened position B to the fastened position A. In the fastened position A, the usable length 82 of the strap 34 is fixed, and the adjustment mechanism 78 may secure the strap 34, so that the strap 34 may absorb tension from the weight and/or pressure of passenger items (for example, pouches 42 and rolled towel 44) disposed on the strap 34.

Figure 2:
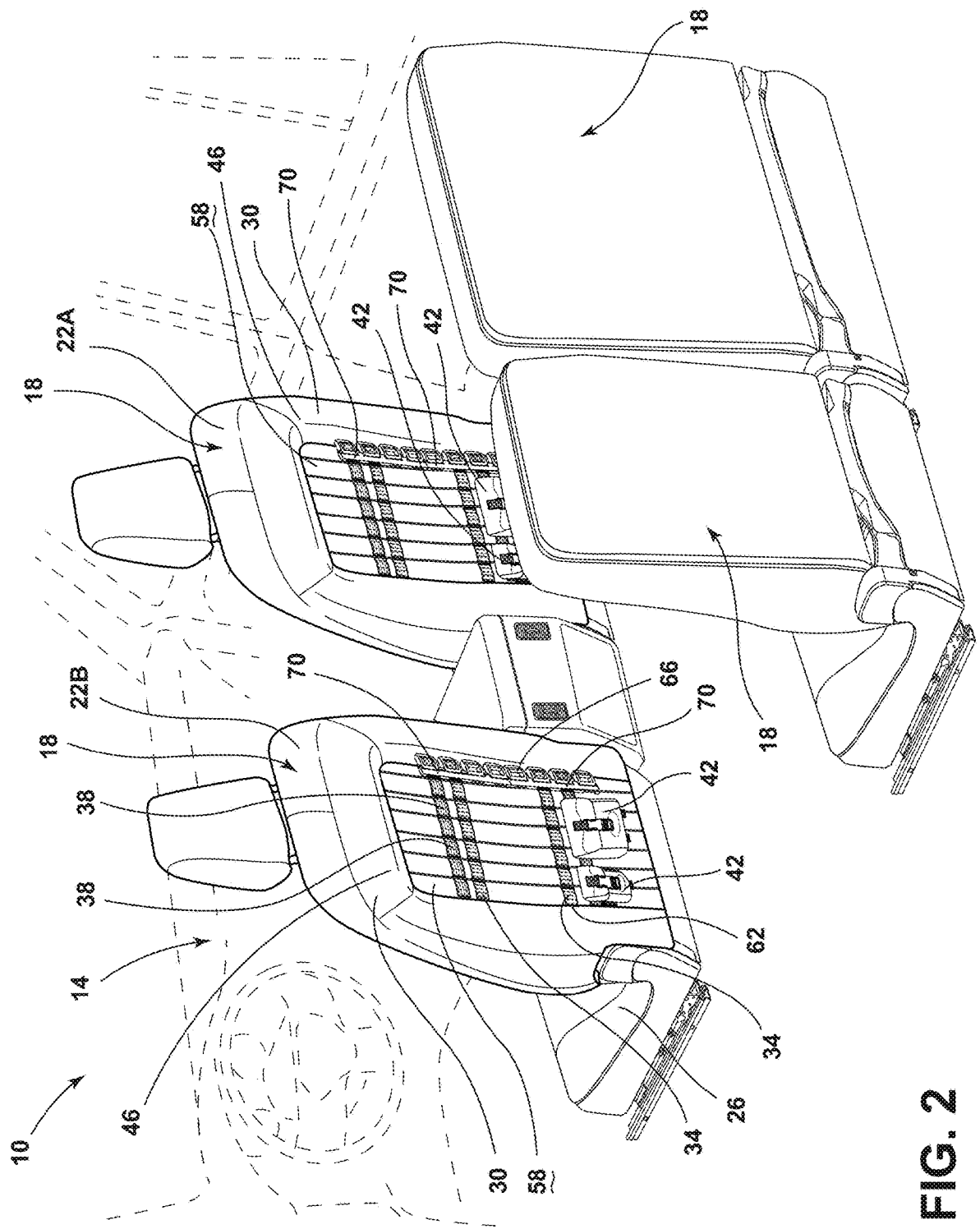
FIG. 2 is a back perspective view of a seatback with a second configuration of an attachment assembly in a vehicle interior, according to an aspect of the present disclosure.

Referring to FIG. 2, the appearance and function of the seatback 30 may be changed by using straps 34 that have different characteristics. In various examples, the straps 34 may be removed from the seatback 30 and replaced with straps 34 having various characteristics (for example, colors, textures, materials, and elasticity). Additionally, the appearance and function of the seatback 30 may be modified by changing the number of straps 34 disposed on the seatback 30. In one example, the straps 34 include a nylon webbing. In one example, the ends 62, 66 of the straps 34 may be heat sealed to minimize fraying of the straps 34. In various examples, the strap may have a 0.75 inch width, a 1.0 inch width, or another width.

Referring now to FIG. 3A, a carrier 50 with straps 34 is shown. Referring to FIG. 3A, the carrier 50 may include carrier member 90, carrier member 94, carrier member 98, and carrier member 102. In the example shown, carrier member 90 and carrier member 94 may be opposing carrier members. In the example shown, carrier member 98 and carrier member 102 may be opposing carrier members. Carrier members 90, 94, 98, and 102 may define a rectangular shape. Carrier members 90 and 94 may provide support for the straps 34. Carrier members 98 and 102 may provide support for the rods 106.

With continued reference to FIG. 3A, the end 62 of each of the plurality of straps 34 may be fixedly coupled to the carrier 50. The end 62 of each of the plurality of straps 34 may be fixedly coupled by a fastener, such as a screw 110, a pin, or a similar fastener. The attachment assembly 70 may be disposed on carrier member 90. A plurality of substantially vertical rods 106 may be disposed transverse to the plurality of horizontal straps 34 and between opposing carrier members 98, 102. The adjustment mechanisms 78 disposed on the elongated member 74 of the attachment assembly 70 may be adjusted to increase, decrease, or maintain a usable length (for example, L1 or L2) of each of the plurality of straps 34. Loops 38 of the straps 34 may be disposed between the rods 106. In various examples, a rod 106 may include any fixed stanchion that allows the straps 34 (also referred to as webbing) to slide back and forth behind the fixed stanchion. In one example, the fixed stanchion may be a substantially vertical fixed stanchion.

The screw 110 and other fasteners that may be used with the straps 34 may be reusable such that the same fastener may be used to fasten different straps to the seatback 30. See, FIG. 2.

Figure 4A:
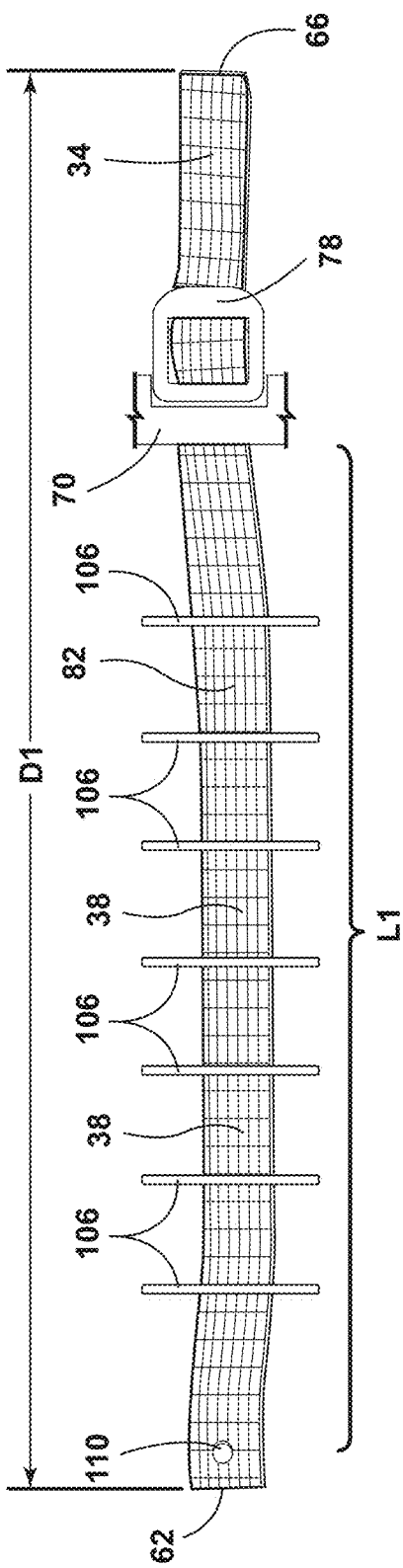
FIG. 4A is a view of a strap engaged with an attachment assembly and having a first usable length.
Figure 4B:
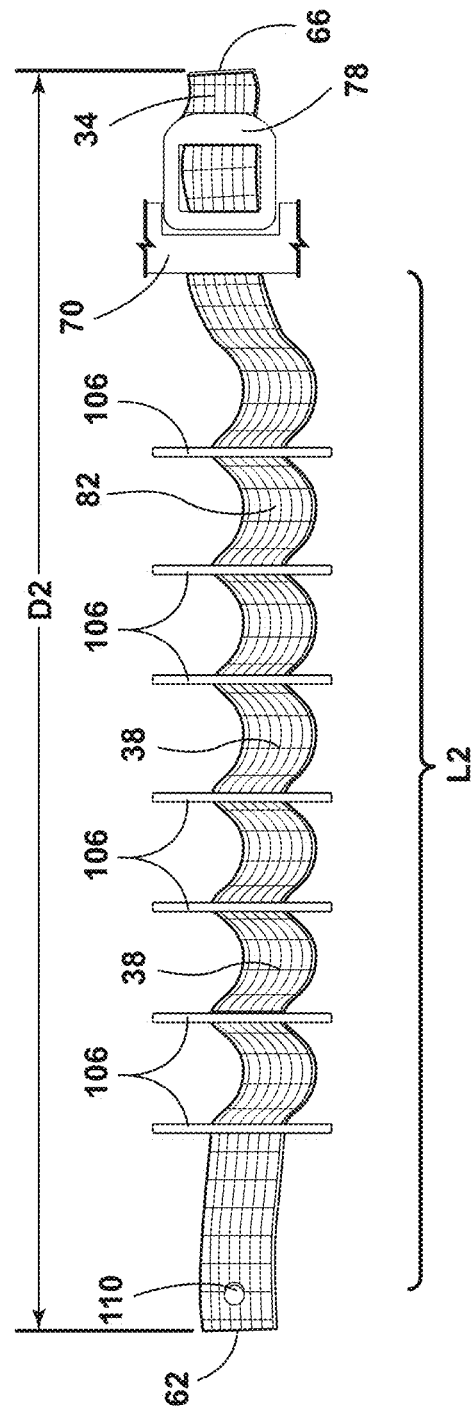
FIG. 4B is a view of a strap engaged with an attachment assembly and having a second usable length.
Figure 7:
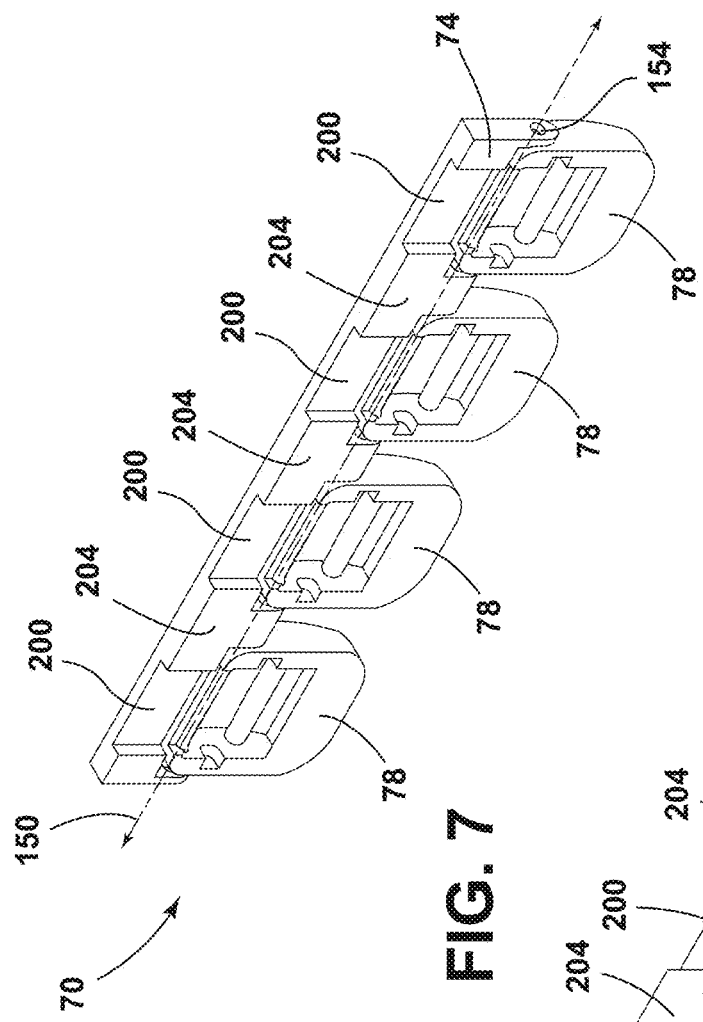
FIG. 7 is a first back perspective view of the attachment assembly of FIG. 5.
Figure 8:
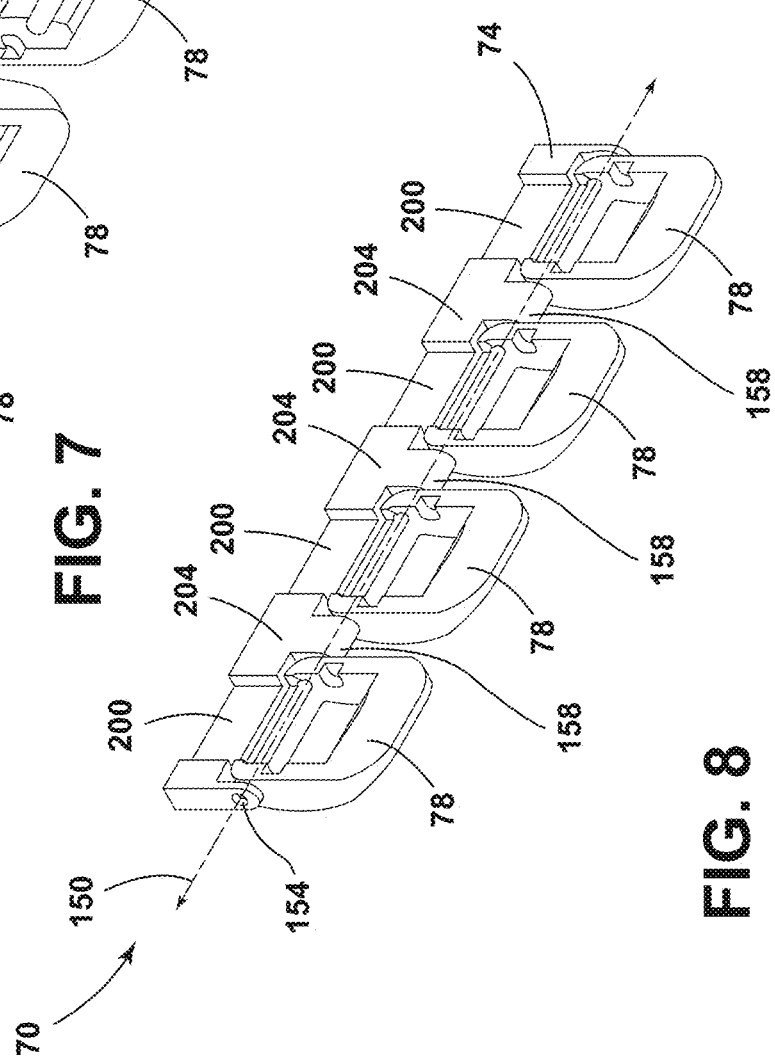
FIG. 8 is a second back perspective view of the attachment assembly of FIG. 5.
Figure 9:
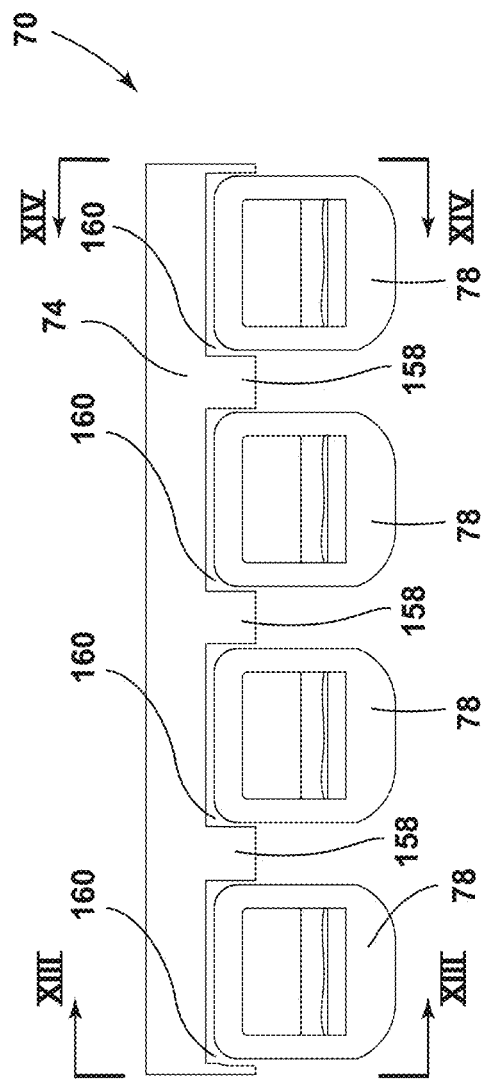
FIG. 9 is a front elevational view of the attachment assembly of FIG. 5.
Figure 10:
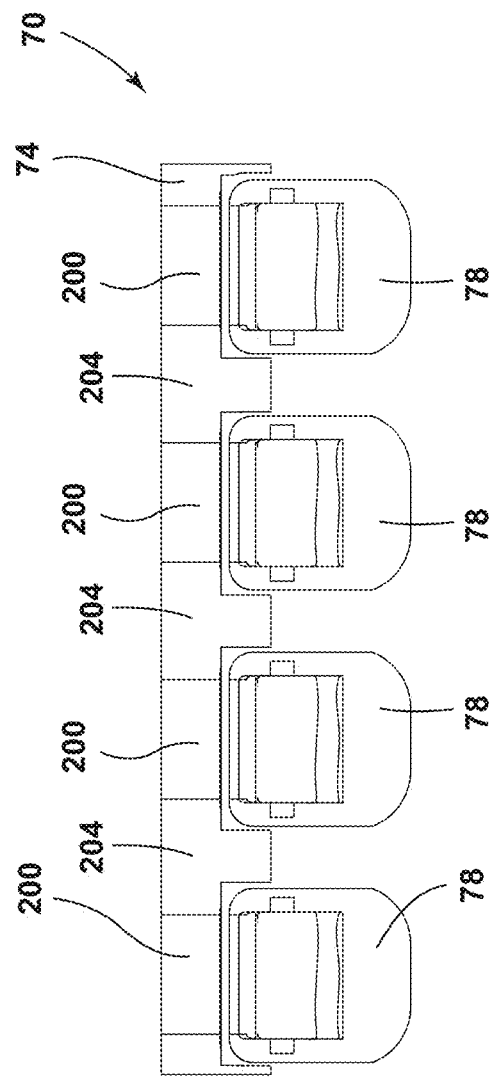
FIG. 10 is a back elevational view of the attachment assembly of FIG. 5.
Figure 11:
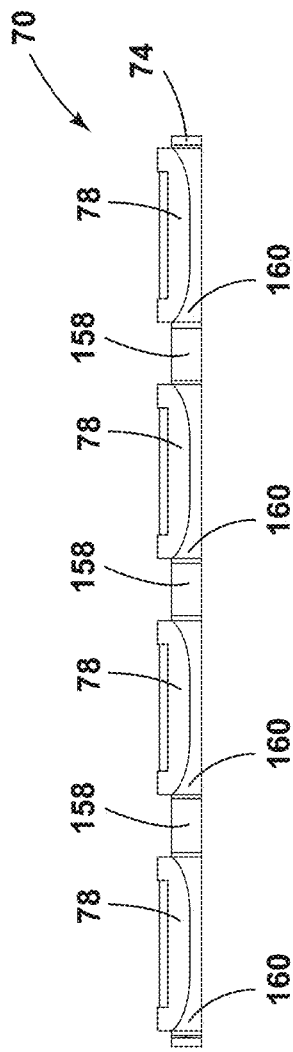
FIG. 11 is a first side elevational view of the attachment assembly of FIG. 5.
Figure 12:
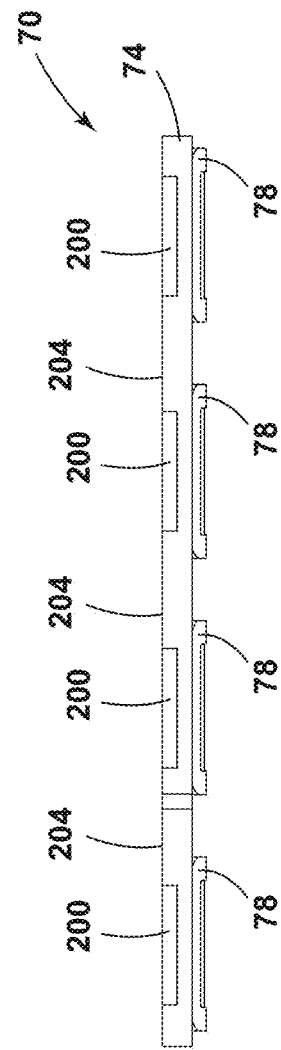
FIG. 12 is a second side elevational view of the attachment assembly of FIG. 5.
Figure 13:
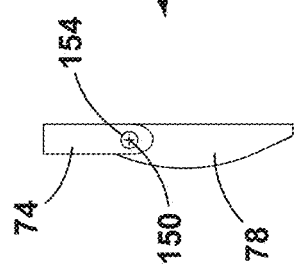
FIG. 13 is a side elevational view of the attachment assembly of FIG. 5 taken along line XIII-XIII of FIG. 9.
Figure 14:
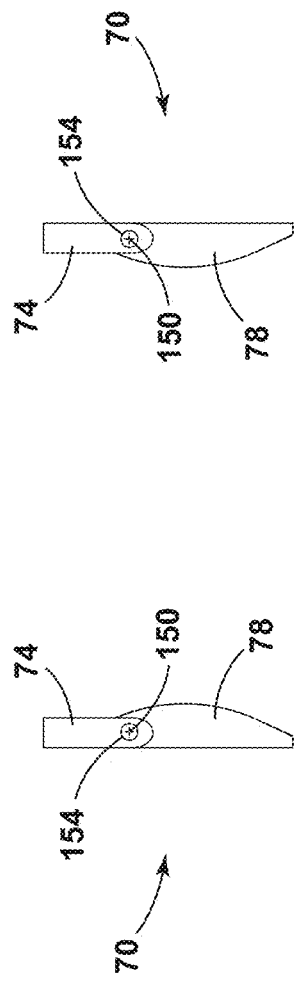
FIG. 14 is a side elevational view of the attachment assembly of FIG. 5 taken along line XIV-XIV of FIG. 9.

With reference to FIGS. 4A-4B, the usable length of each of the plurality of straps 34 may be varied between a first usable length L1 (FIG. 4A), a second usable length L2 (FIG. 4B), and intermediate usable lengths between the first usable length L1 and the second usable length L2. In the example shown in FIGS. 4A-4B, the first usable length L1 is shorter than the second usable length L2. The strap 34 may form loops 38 between the rods 106. The strap 34 arranged with a first usable length L1 (FIG. 4A) includes smaller loops 38 than the strap 34 arranged with a second usable length L2 (FIG. 4B).

With reference again to FIG. 3A, in various examples, the carrier members 90, 94, 98, 102 may be part of a carrier 50 that is disposed in the seatback 30, on the surface of the seatback 30, or partially on the surface of the seatback 30 and in the seatback 30. As previously stated, the carrier members 90, 94, 98, 102 may also be separate components that may not be joined to one another and that may be arranged to provide support for the straps 34 and the rods 106.

With continued reference to FIG. 3A, in various examples, positioners 120 may be disposed between the rods 106 and a seatback surface 58. Each positioner 120 may include a first portion and a second portion. The first portion of each positioner 120 may be a base 124 that may be designed to lay flat against the seatback surface 58. The base 124 may include a flat area that is disposed against the seatback surface 58. The second portion of each positioner 120 may include a protrusion 132 that extends away from the base 124. The protrusion 132 may include a groove 136 for receiving a rod 106. The protrusions 132 with grooves 136 may maintain spaces between the rods 106. The positioners 120 may maintain the rods 106 at a predetermined distance from the seatback surface 58. Additionally, the protrusions 132 may be arranged to maintain spaces between the straps 34. In various examples, more than one row of positioners 120 may be disposed on the seatback surface 58. Additionally, individual positioners 120 may be disposed at various locations on the seatback surface 58.

Figure 3B:
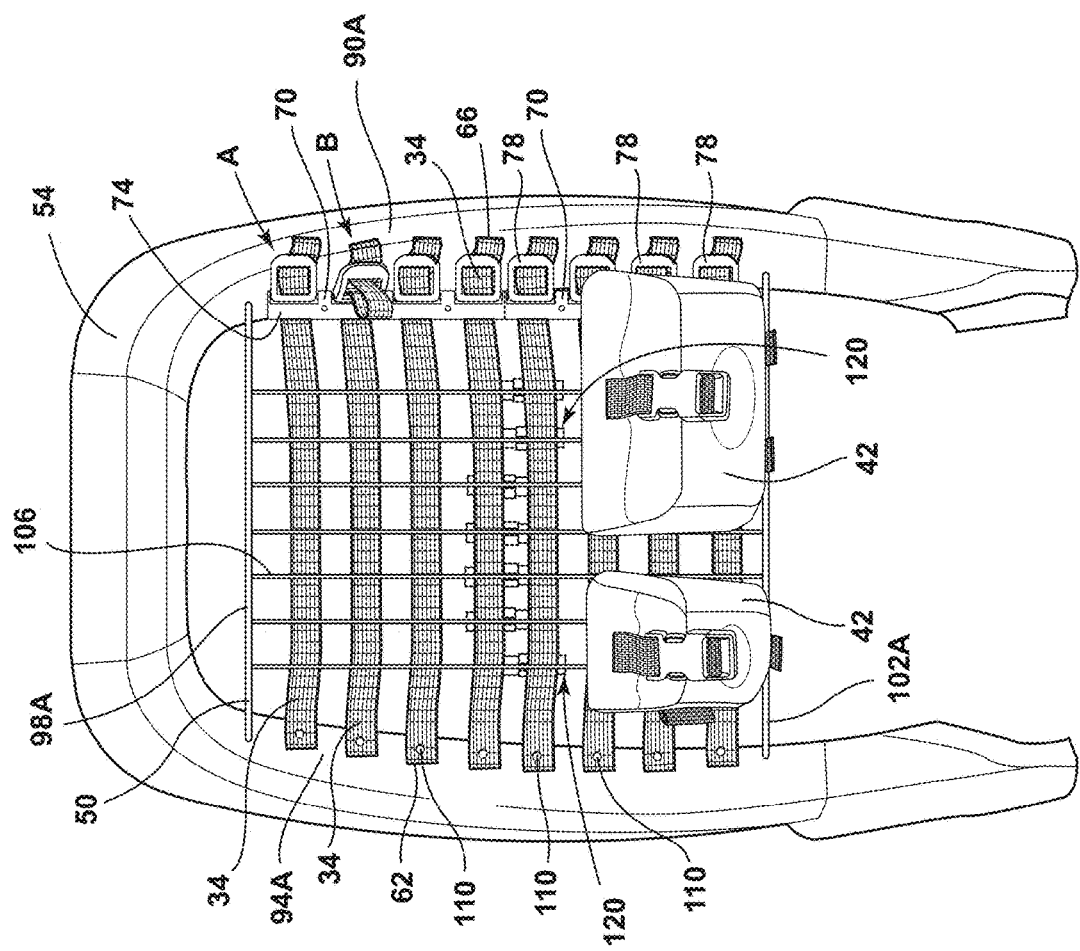
FIG. 3B is a front elevational view of attachment assemblies and straps disposed on a seatback frame, according to an aspect of the present disclosure.

Referring to FIG. 3B, the straps 34 and the attachment assemblies 70 may be disposed on a seatback frame 54. The seatback frame 54 may include a first frame member 90A, a second frame member 94A, a third frame member 98A, and a fourth frame member 102A.

With reference to FIGS. 5-14, the adjustment mechanisms 78 may be pivotably coupled to the elongated member 74. The adjustment mechanisms 78 may be rotatable about an axis 150 defined by a connector (for example, a pin 154) extending through the elongated member 74 and the adjustment mechanisms 78. End portions 156 may be disposed on the edges of the attachment assemblies 70. In various examples, the connector may be a pin 154A that extends through the adjustment mechanism 78 and the one or more tabs 158 and/or end portions 156 disposed on either side of the adjustment mechanism 78. Alternatively, the connector may be a pin 154 that extends through all of the tabs 158, the four adjustment mechanisms 78, and the end portions 156. The adjustment mechanisms 78 may also be pivotably retained in the recesses 160 in the elongated member 74 with an interference fit. For example, nubs may protrude from an adjustment mechanism 78 and be received in indentations in the walls of a recess 160.

With reference to FIGS. 5-14, the elongated member 74 of the attachment assembly 70 may include recesses 160 for receiving the adjustment mechanisms 78. In the example shown, the adjustment mechanisms 78 include an inner portion and an outer portion. The outer portion of the adjustment mechanism 78 may be referred to as a housing 162. The housing 162 of each adjustment mechanism 78 may be generally square-shaped. The square shape may be defined by a side portion 166, a side portion 170, a side portion 174, and a side portion 178. Side portions 166 and 170 may be opposing side portions. Side portions 174 and 178 may be opposing side portions. Rounded corners 182 may be disposed between side portions 166 and 178, side portions 178 and 170, side portions 170 and 174, and side portions 174 and 166. In the example shown, the inner portion of the adjustment mechanism 78 may include a cross member 186 bisecting the housing 162 of the adjustment mechanism 78. The adjustment mechanism 78 may be designed to allow a strap 34 to be routed through the adjustment mechanism 78 and around the cross member 186. The cross member 186 may include teeth 190 for grasping the strap 34 and holding it in a fastened position A, so that the usable length 82 of the strap 34 is fixed. The strap 34 and the cross member 186 may form an interference fit in the fastened position A. The attachment assembly 70 may be designed to hold the strap 34 in a fastened position A within the adjustment mechanism 78, so that tension exerted on the strap 34 from the adjustment mechanism 78 in the fastened position A allows for the strap 34 to support the weight of suspended passenger items (for example, storage pouches 42 and rolled towel 44). Examples of other adjustment mechanisms 78 that may be used with the elongated member 74 are shown in FIGS. 15A-15C and 16A-16C.

With reference again to FIGS. 5-14, channels 200 for receiving the straps 34 may be disposed on the seatback 30 facing side of the elongated member 74. The channels 200 may be designed to fit a particular width of strap 34 (for example, a strap 34 having a 0.75 inch width or a 1.00 inch width). The straps 34 may lay flat within the channels 200. Spacers 204 may be disposed between the channels 200. Tabs 158 that separate the adjustment mechanisms 78 may extend from the spacers 204.

In various examples, the elongated member 74 and the adjustment mechanisms 78 may be a molded polymer material. In various examples, the adjustment mechanisms 78 and/or the elongated member 74 may be metal.

With reference to FIGS. 15A-15C, an example of an adjustment mechanism 78A is shown. The adjustment mechanism 78A may include a first portion and a second portion. The first portion may be a housing 162A. The housing 162A may be square-shaped. The second portion may include one or more cross members 186A. The cross member 186A may include teeth 190A disposed in a direction facing away from the seatback surface 58. The strap 34 may be routed through the adjustment mechanism 78A to maintain the strap 34 at a fixed usable length 82 in the adjustment mechanism 78A in the fastened position A. Teeth 190A disposed on the cross member 186A of the adjustment mechanism 78A may extend into the cross member 186A and may help to maintain the strap 34 at a fixed usable length 82. As such, the strap 34 may be in tension, and the strap 34 may support items (such as pouches 42 and rolled towel 44) disposed on the strap 34.

Figure 16A:
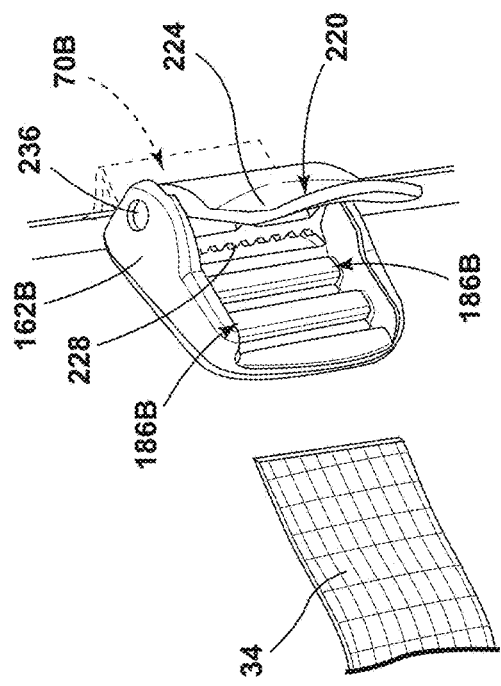
FIG. 16A is perspective view of an example of an adjustment mechanism with a lever in the partially open position and a strap.
Figure 16B:
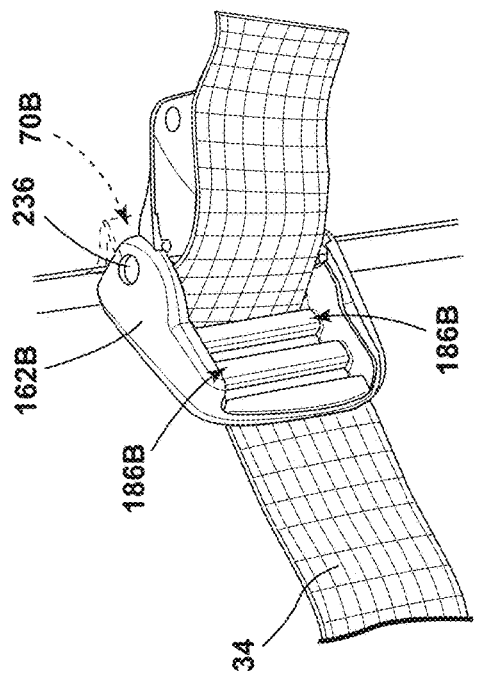
FIG. 16B is a perspective view of the adjustment mechanism of FIG. 16A with a lever in a fully open position and a strap.
Figure 16C:
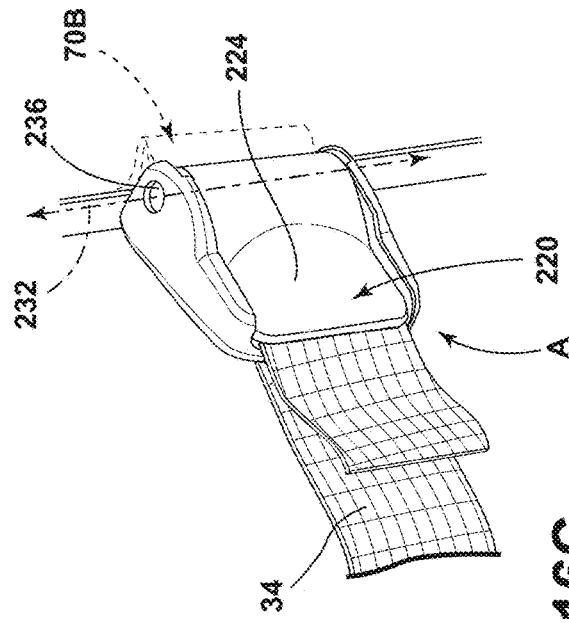
FIG. 16C is a perspective view of the adjustment mechanism of FIG. 16A with a lever in a closed position and a strap with the adjustment mechanism in the fastened position.

With reference to FIGS. 16A-16C, an example of an adjustment mechanism 78B is shown. The adjustment mechanism 78B may include a first portion and a second portion. The first portion may include a housing 162B, and the second portion may include one or more cross members 186B. The housing 162B may be square-shaped. A lever 220 may be pivotably coupled to the first portion. The lever 220 may be L-shaped. The lever 220 may include a grab portion 224 and a toothed ledge 228. A passenger may rotate the lever 220 about an axis 232 defined by a pin 236 disposed through the housing 162B and the lever 220. The lever 220 may be rotated between a partially open position (FIG. 16A), a fully open position (FIG. 16B), and a closed position (FIG. 16C). The closed position (FIG. 16C) may also be referred to as a fastened position A. In the closed position, the toothed ledge 228 may form an interference fit with the strap 34 to help secure the strap 34 in place and to prevent the strap 34 from sliding in the adjustment mechanism 78B. As such, the strap 34 may be in tension, and the strap 34 may support items (such as pouches 42 and rolled towel 44) disposed on the strap 34.

Figure 20:
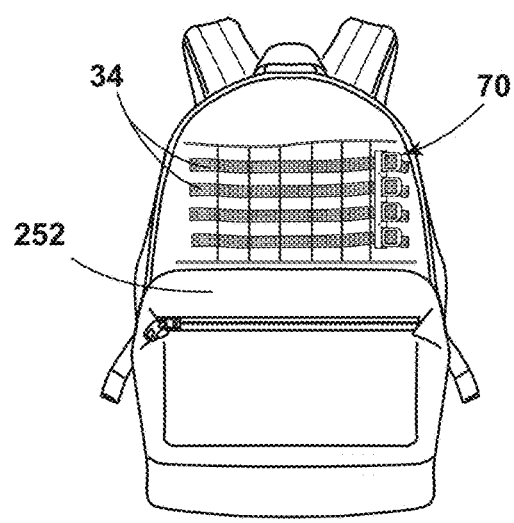
FIG. 20 is a front view of an attachment assembly and straps disposed on a backpack, according to an aspect of the present disclosure.
Figure 21:
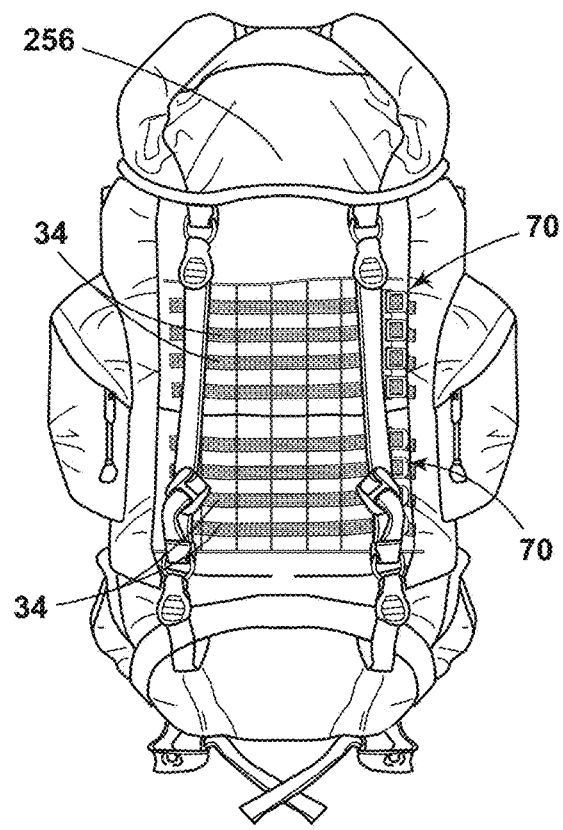
FIG. 21 is a front view of an attachment assembly and straps disposed on a hiking backpack, according to an aspect of the present disclosure.
Figure 22:
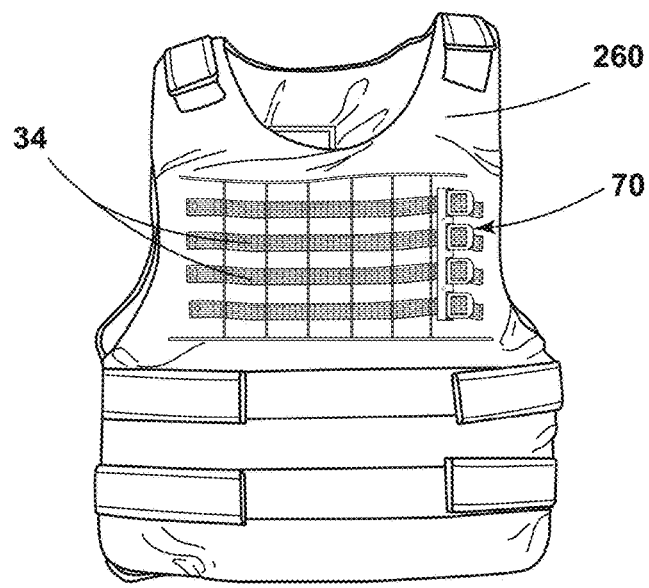
FIG. 22 is a front view of an attachment assembly and straps disposed on a vest, according to an aspect of the present disclosure.

Referring to FIGS. 17-22, the attachment assembly 70 is shown on various mountable surfaces. The mountable surfaces include areas of: a vehicle door 240 (FIG. 17), a vehicle tailgate 244 (FIG. 18), a vehicle headliner 248 (FIG. 19), a backpack 252 (FIG. 20), a hiking backpack 256 (FIG. 21), and a vest 260 (FIG. 22). It is to be understood that areas of the seat 18 (for example, seatback 30) discussed with reference to FIGS. 1-16 may also be referred to as mountable surfaces.

Figure 17:
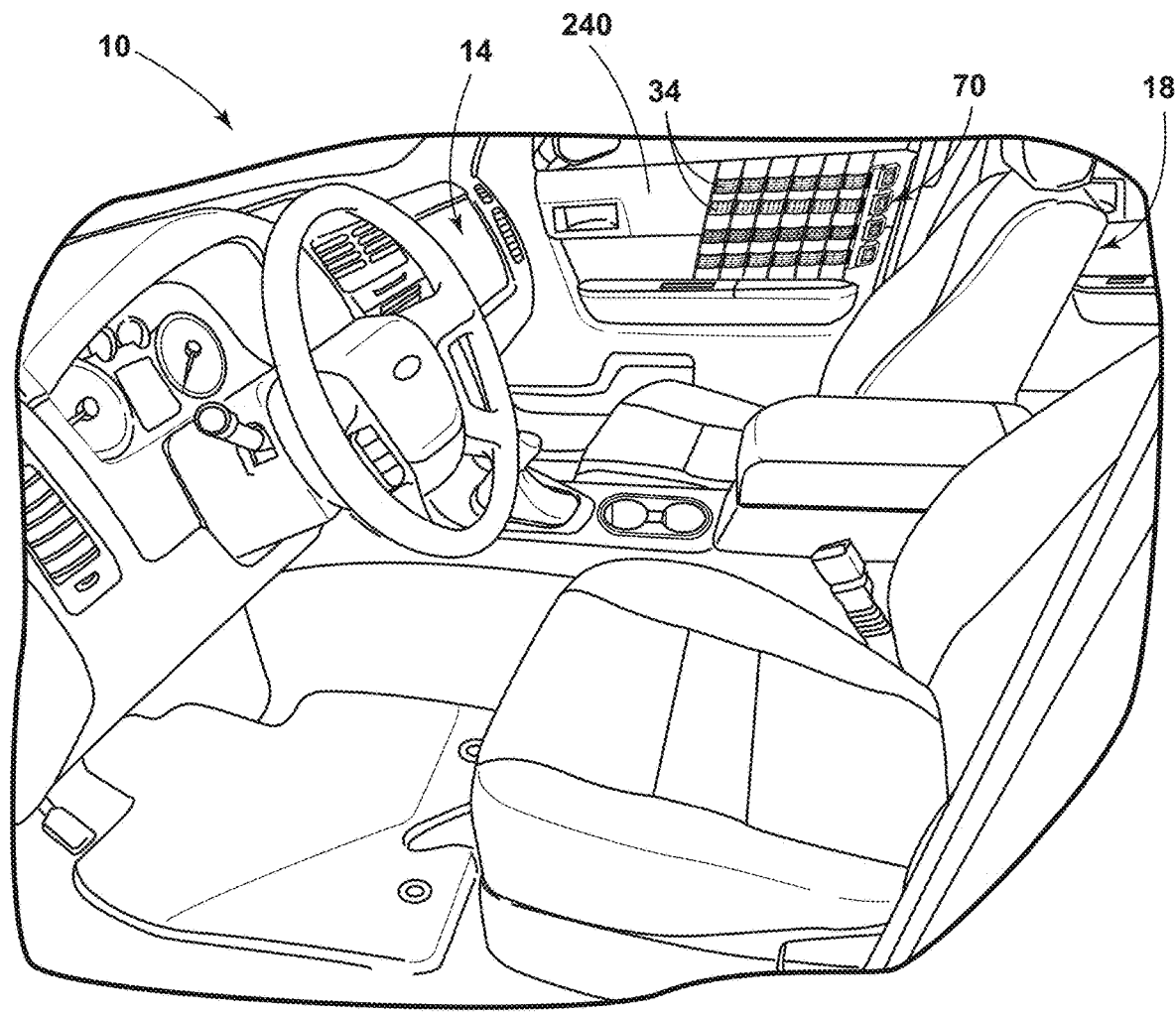
FIG. 17 is a perspective view of an attachment assembly and straps disposed on a door, according to an aspect of the present disclosure.

Referring to FIG. 17, in one example, the attachment assembly 70 and straps 34 may be mounted on the interior of a vehicle door 240.

Figure 18:
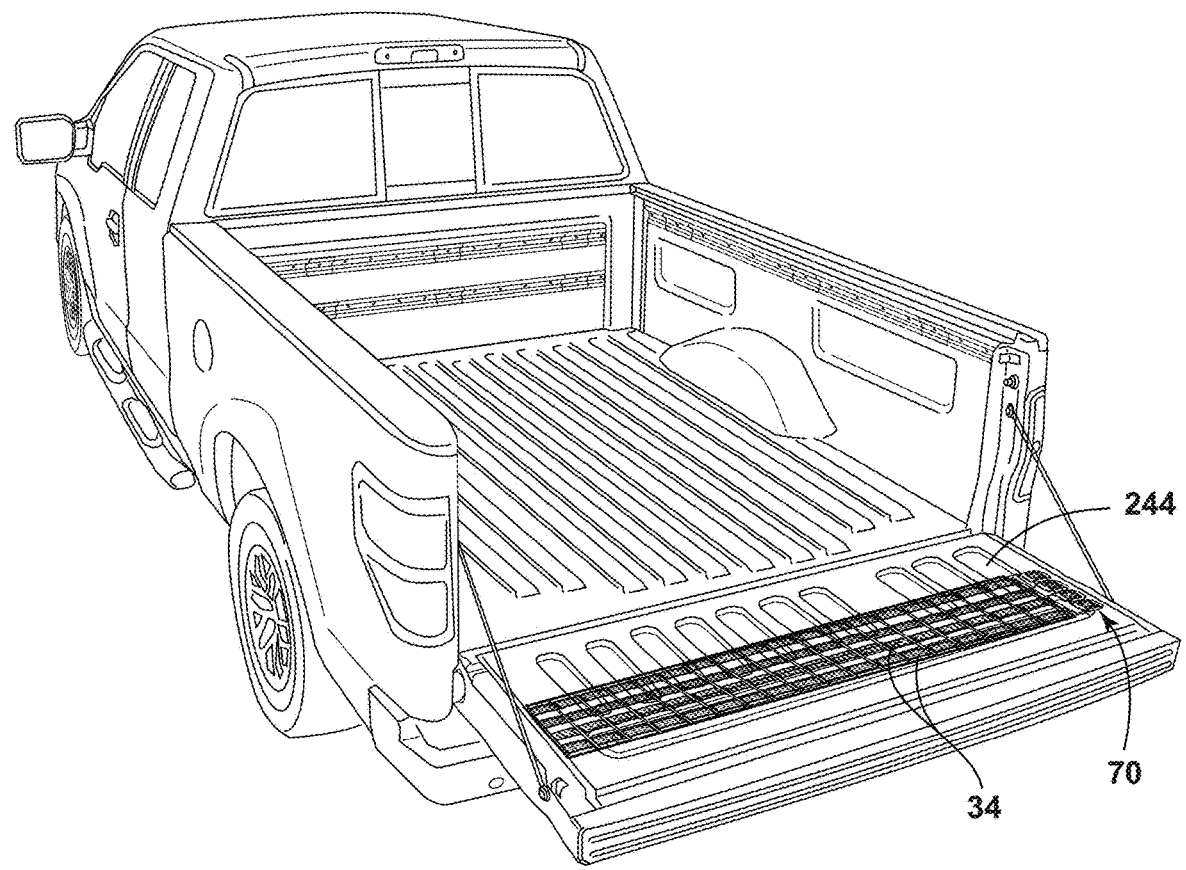
FIG. 18 is a perspective view of an attachment assembly and straps disposed on a tailgate, according to an aspect of the present disclosure.

Referring to FIG. 18, in one example, the attachment assembly 70 and straps 34 may be mounted on a vehicle tailgate 244.

Figure 19:
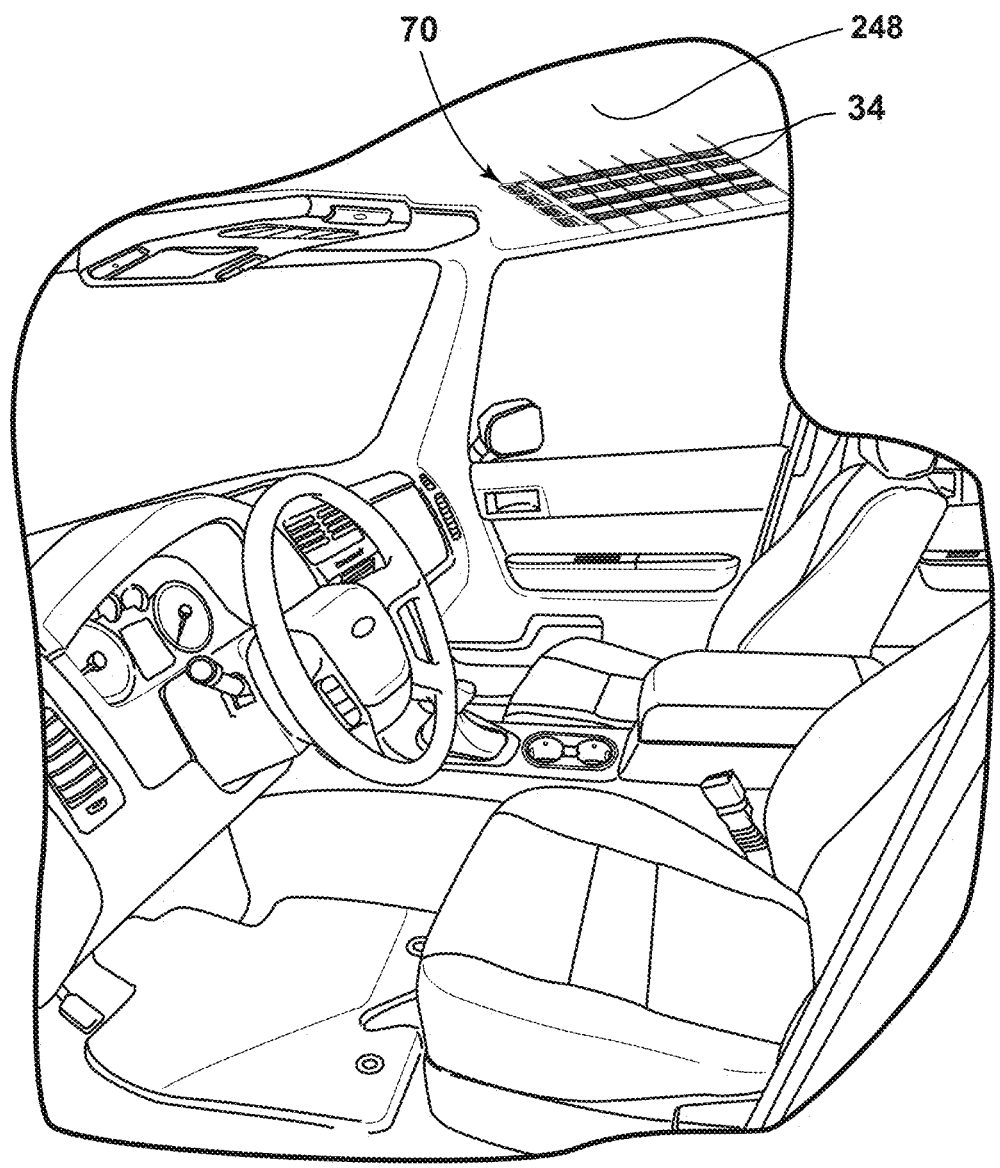
FIG. 19 is a perspective view of an attachment assembly and straps disposed on a headliner, according to an aspect of the present disclosure.

Referring to FIG. 19, in one example, the attachment assembly 70 and straps 34 may be mounted to a vehicle headliner 248.

Referring to FIG. 20, in one example, the attachment assembly 70 and straps 34 may be mounted to a backpack 252.

Referring to FIG. 21, in one example, the attachment assembly 70 and straps 34 may be mounted to hiking gear. For example, the attachment assembly 70 and straps 34 may be mounted to a hiking backpack 256.

Referring to FIG. 22, in one example, the attachment assembly 70 and straps 34 may be mounted to tactical gear. For example, the attachment assembly 70 and straps 34 may be mounted to a vest 260 that may be considered tactical gear. The vest 260 may also be referred to as an item of clothing.

It is contemplated that the attachment assembly 70 could be utilized on a variety of mountable surfaces in addition to the mountable surfaces shown in FIGS. 1-22.

With reference to FIGS. 1-22, an attachment assembly (for example, 70, 70A, 70B) comprises an elongated member 74 configured for mounting to a mountable surface (for example, seat 18, seatback 30, door 240, tailgate 244, headliner 248, backpack 252, backpack 256, and/or tactical gear 260). One or more adjustment mechanisms (for example, 78, 78A, 78B) are positionable in a fastened position A or an unfastened position B, are rotatably coupled to the elongated member 74, are positionable in respective one or more recesses 160 in the elongated member 74, and are configured to receive an end 66 of each of one or more straps 34 disposed across the mountable surface (for example, seat 18, seatback 30, door 240, tailgate 244, headliner 248, backpack 252, backpack 256, and/or tactical gear 260). In the fastened position A, the one or more adjustment mechanisms (for example, 78, 78A, 78B) are configured to substantially immobilize portions of the one or more straps 34 in the adjustment mechanism (for example, 78, 78A, 78B).

Referring again to FIGS. 1-22, a mountable surface (for example, seat 18, seatback 30, door 240, tailgate 244, headliner 248, backpack 252, backpack 256, and/or tactical gear 260) for an attachment assembly (for example, 70, 70A, 70B) comprises a plurality of detachable straps 34 disposed across the mountable surface (for example, seat 18, seatback 30, door 240, tailgate 244, headliner 248, backpack 252, backpack 256, and/or tactical gear 260) and positioned against the mountable surface (for example, seat 18, seatback 30, door 240, tailgate 244, headliner 248, backpack 252, backpack 256, and/or tactical gear 260) by one or more retainers (for example, rods 106) extending along the mountable surface (for example, seat 18, seatback 30, door 240, tailgate 244, headliner 248, backpack 252, backpack 256, and/or tactical gear 260) and transverse to the plurality of detachable straps 34. Each of the plurality of detachable straps 34 includes a first end 62 and a second end 66. A support structure (for example, carrier 50 or seatback frame 54) is disposed on or behind the mountable surface (for example, seat 18, seatback 30, door 240, tailgate 244, headliner 248, backpack 252, backpack 256, and/or tactical gear 260) and has a side configured to receive a releasable fastener (for example, screw 110) for securing the first end 62 to the mountable surface (for example, seat 18, seatback 30, door 240, tailgate 244, headliner 248, backpack 252, backpack 256, and/or tactical gear 260). An attachment assembly (for example, 70, 70A, 70B) is coupled to the support structure (for example, carrier 50 or seatback frame 54) and includes a mounting member (for example, elongated member 74) and one or more adjustment mechanisms (for example, 78, 78A, 78B) each nestable in a recess 160 of the mounting member (for example, elongated member 74), pivotable relative to the mounting member (for example, elongated member 74), and positionable in a fastened position A or an unfastened position B. In the fastened position A, each of the plurality of detachable straps 34 has a fixed usable length 82, and in the unfastened position B, each of the plurality of detachable straps 34 is adjustable between a first usable length L1 and a second usable length L2.

It is to be understood that in various examples of the disclosure, the straps 34 and the rods 106 may be positioned in various orientations on the seat 18 or other mountable surface (for example, seat 18, seatback 30, door 240, tailgate 244, headliner 248, backpack 252, backpack 256, and/or tactical gear 260). For example, the straps 34 may be disposed in a substantially vertical position, and the rods 106 may be disposed in a substantially horizontal position. Additionally, the straps 34 may be disposed in a first diagonal position, and the rods 106 may be disposed in a second diagonal position and transverse to the straps 34.

It is further to be understood that the straps 34 and the rods 106 may be disposed on a variety of seat 18 surfaces in addition to the seatback 30. For example, the straps 34 and the rods 106 may be disposed on a side of the seat bottom 26 or a side of the seatback 30. Additionally, the straps 34 and the rods 106 may be disposed on other mountable surfaces (for example, door 240, tailgate 244, headliner 248, backpack 252, backpack 256, and/or tactical gear 260).

A variety of advantages may be derived from the present disclosure. A passenger may arrange straps 34 on the seat 18 or other mountable surface (for example, seatback 30, door 240, tailgate 244, headliner 248, backpack 252, backpack 256, and/or tactical gear 260) to meet the individual storage needs of the passenger. Additionally, a passenger may conveniently adjust the usable lengths 82 of the straps 34 to accommodate specific passenger items (for example, storage pouches 42 or a rolled towel 44).

It is to be understood that variations and modifications can be made to the aforementioned structure without departing from the concepts of the present invention, and further it is to be understood that such concepts are intended to be covered by the following claims, unless these claims, by their language, expressly state otherwise.

What is claimed is:

1. A vehicle seat, comprising:
    a carrier including first, second, third, and fourth carrier members;
    a strap disposed across opposing first and second carrier members, the strap including:
        a first end fixedly coupled to the first carrier member; and
        a second end adjustably coupled to an attachment assembly disposed on the second carrier member; and
    a rod disposed transverse to the strap and coupled to opposing third and fourth carrier members, wherein the attachment assembly includes an adjustment mechanism for setting a usable length of the strap, wherein the usable length includes a first usable length, a second usable length, and an intermediate length between the first usable length and the second usable length, and wherein the attachment assembly includes an elongated member, and wherein the adjustment mechanism is pivotably coupled to the elongated member.

2. The vehicle seat of claim 1, wherein the adjustment mechanism is rotatable about an axis defined by a connector extending through the elongated member and the adjustment mechanism.

3. The vehicle seat of claim 2, wherein the adjustment mechanism includes a first portion and a second portion.

4. The vehicle seat of claim 3, wherein the first portion includes a housing, and wherein the second portion includes a cross member.

5. The vehicle seat of claim 4, wherein the cross member extends across the housing.

6. The vehicle seat of claim 5, wherein the cross member includes teeth.

7. The vehicle seat of claim 1, wherein the attachment assembly is mounted to the second carrier member.

8. The vehicle seat of claim 7, wherein the carrier includes a seatback frame.

9. The vehicle seat of claim 7, wherein the strap is one of a plurality of straps, the rod is one of a plurality of rods, and the adjustment mechanism is one of a plurality of adjustment mechanisms.

10. The vehicle seat of claim 9, wherein the plurality of straps are disposed in a horizontal position, and wherein the plurality of rods are disposed in a vertical position.

11. The vehicle seat of claim 9, further comprising:
    a seatback surface disposed behind the carrier; and
    one or more positioners disposed between the seatback surface and the plurality of rods.

12. The vehicle seat of claim 11, wherein at least one of the one or more positioners includes a base portion and a protrusion.

13. The vehicle seat of claim 1, wherein the strap is removably fastened to the first carrier member with a detachable fastener.

14. A mountable surface for an attachment assembly, comprising:
    a plurality of detachable straps disposed across the mountable surface and positioned against the mountable surface by one or more retainers extending along the mountable surface and transverse to the plurality of detachable straps, each of the plurality of detachable straps including a first end and a second end;

a support structure disposed on or behind the mountable surface and having a side configured to receive a releasable fastener for securing the first end to the mountable surface; and an attachment assembly coupled to the support structure and including:

a mounting member; and one or more adjustment mechanisms each nestable in a recess of the mounting member, pivotable relative to the mounting member, and positionable in a fastened position or an unfastened position, wherein, in the fastened position, each of the plurality of detachable straps has a fixed usable length, and wherein, in the unfastened position, the each of the plurality of detachable straps is adjustable between a first usable length and a second usable length.

15. The mountable surface for an attachment assembly of claim 14, wherein portions of the plurality of detachable straps disposed between a first retainer and a second retainer form loops configured to support passenger items on the mountable surface, and wherein the mountable surface includes one or more of: a seat, a seatback, a vehicle door, a vehicle tailgate, a vehicle headliner, a backpack, and an item of clothing.

* * * * *